United States Patent
Loupia et al.

(10) Patent No.: US 8,249,233 B2
(45) Date of Patent: Aug. 21, 2012

(54) APPARATUS AND SYSTEM FOR REPRESENTATION OF VOICES OF PARTICIPANTS TO A CONFERENCE CALL

(75) Inventors: David Loupia, Carros (FR); Joaquin Picon, Cezanna (FR); Nicolas Schifano, Cagnes sur Mer (FR); Laurent Vincent, Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 11/685,246

(22) Filed: Mar. 13, 2007

(65) Prior Publication Data

US 2007/0217590 A1   Sep. 20, 2007

(30) Foreign Application Priority Data

Mar. 17, 2006   (EP) .................................... 06300241

(51) Int. Cl.
 *H04M 3/42* (2006.01)
 *H04M 1/64* (2006.01)
(52) U.S. Cl. ............. 379/202.01; 379/88.02; 379/88.21; 379/207.13
(58) Field of Classification Search ............. 379/202.01, 379/88.02, 207.13, 201.01, 88.21, 88.19, 379/88.2; 348/14.09; 709/204; 370/260; 704/247
See application file for complete search history.

(56) References Cited

U.S. PATENT DOCUMENTS

| | | | |
|---|---|---|---|
| 6,192,395 B1 * | 2/2001 | Lerner et al. ................ | 709/204 |
| 6,262,979 B1 | 7/2001 | Anderson et al. | |
| 6,850,496 B1 * | 2/2005 | Knappe et al. ................ | 370/260 |
| 6,865,264 B2 | 3/2005 | Berstis | |
| 6,868,149 B2 | 3/2005 | Berstis | |
| 7,386,448 B1 * | 6/2008 | Poss et al. ...................... | 704/247 |
| 2005/0206721 A1 * | 9/2005 | Bushmitch et al. ......... | 348/14.09 |
| 2009/0080623 A1 * | 3/2009 | Creamer et al. ........... | 379/88.02 |

OTHER PUBLICATIONS

Anil K. Kain, Arun Ross, Salil Prabhakar, "An Introduction to Biometric Recognition", IEEE, vol. 14, No. 1, Jan. 2004.
Bill Gardner and Keith Martin, "HRTF Measurements of a KEMAR Dummy-Head Microphone", MIT Media Lab, May 18, 1994.
A. F. Souza, "Comparative Analysys of Speech Parameters for the Design of Speaker Verification Systems", 2001 Proceedings of the 23rd Annual EMBS International Conference, Oct. 25-28, Istanbul, Turkey.
Muhammad Noman Nazar, "Speaker Identification Using Cepstral Analysis", Center for Research in Urdu Language Processing (CRULP) National University of Computer and Emerging Sciences (NUCES) mscs024@nu.edu.pk, IEEE 2002.
Alan V. Oppenheim, et al, "Discrete-Time Signal Processing", Pentice Hall, 2nd edition (Feb. 15, 1999, ISBN: 0137549202, pp. 582-588.

* cited by examiner

*Primary Examiner* — Thjuan K Addy
(74) *Attorney, Agent, or Firm* — Steven L. Nichols; VanCott, Bagley, Cornwall & McCarthy P.C.

(57) ABSTRACT

A system for facilitating to an end-user the recognition of other participants attending a conference call, comprising means attached to the end-user's telephone for receiving signals from the telephone line, means for analyzing the telephone line signals and associating a unique caller identification to each new participant joining the conference call, means for associating with each such caller identification, a unique position in a representation of the conference call, and means for representing to the end-user such unique position for all participants in the conference call.

25 Claims, 7 Drawing Sheets

APPARATUS AND SYSTEM FOR REPRESENTATION OF VOICES OF PARTICIPANTS TO A CONFERENCE CALL

FIELD OF THE INVENTION

The present invention relates to the representation of voices of participants attending a conference call, and more particularly to the recognition and distribution of voices of such participants in a planar or spatial representation of the phone conference.

BACKGROUND OF THE INVENTION

The improvement of telecommunications has yielded a great increase of tele-meetings between remote colleagues. These virtual meetings can use different media, such as the phone or the Internet. Different means of interacting with the other parties are offered, either audio (for example a telephone set, either fixed or cellular) or video. It is now common to have many people active in such virtual meetings calling from different areas of the globe. Thus, in a phone conference, one participant has to interact with different people that one often doesn't know beforehand, and sometimes in a language different from one's mother tongue.

It may be difficult for a participant to distinguish between the other participants as they may talk at any time without each time presenting themselves, have similar voices, etc., making it difficult to distinguish who is actually speaking. A system that helps the participant in distinguishing between the different participants during a phone conference would then be very useful. Such a system would have to recognize the different participants and then make a representation of them that the participant can easily decipher and use to facilitate interaction with other participants. For a system to identify other participants, it can either recognize the calling device or the calling person, the two options offering different capabilities. Then a user-friendly representation of the conference call must be built by the system and presented to the participant, under a text, audio or video format.

Different systems have been designed pertaining to the identification of callers and a representation of a conference call to a participant. U.S. Pat. No. 6,868,149 describes a system to display information about any one caller on a telephone or computer screen of the participant. Each caller is identified using a combination of different means, such as line sensing and voice identification.

While previous inventions offer various means for identifying callers, they never provide the participant with a user-friendly representation of the conference call. In addition they may require expensive display facilities (such as a personal computer screen) as all the caller identifications may not fit on a regular phone screen. Moreover, they are useless for participants with viewing disabilities.

SUMMARY OF THE INVENTION

The present invention is defined by the system set out in the claims. It provides for an end-user attending a conference call, a representation of other callers in the conference call so as to enable the end-user to better recognize them. This is achieved by providing a unique position for each caller in such representation. A regular telephone line is used, and the system does not need any additional device, such as a central server hooked up to the telephone network.

More particularly, there is devised a system for facilitating to an end-user the recognition of other participants attending a conference call, comprising means attached to the end-user's telephone for receiving signals from the telephone line, means for analyzing the telephone line signals and associating a unique caller identification to each participant joining the conference call, means for associating with each such caller identification a unique position in a representation of the conference call, and means for representing to the end-user such unique positions for all participants in the conference call. In some embodiments, these functions may be performed by computer program instructions for execution by a computer that are stored on a storage medium.

For example, a storage medium containing computer program instructions, which, when executed by a computer, can cause the computer to perform a method for facilitating, to an end-user, the recognition of participants attending a conference call. Such as storage medium contains

- program instructions for receiving signals from a telephone line;
- program instructions for analyzing said telephone line signals and associating a unique caller identification to each participant joining the conference call;
- program instructions for associating with each said caller identification, a unique spatial position in a stereophonic representation of the conference call; and
- program instructions for converting said telephone line signals into said stereophonic representation of said conference call in which, to said end-user, voices of different participants in said conference call are made to sound as coming from different directions corresponding to said unique positions associated with the caller identifications for participants in the conference call such that said end-user can more readily distinguish between different participants who are speaking during the conference call; and
- program instructions with which said end user selects whether said unique positions are arranged (1) around said end-user in three-dimensions on a sphere, each unique position being defined by an azimuth and elevation relative to said sphere, or (2) around said end-user in two-dimensions on a circle.

In one embodiment, the system makes use of biometric analysis of the participants' voices.

In another embodiment, the representation of the conference call has a predetermined number of positions.

In a further embodiment, representation of a new participant in excess of a number of participants equal to a predetermined number of positions involves computing the difference between biometric analysis of the new participant with each current participant, and associating with the new participant a position in the representation which is the same as the position of the current participant with the most difference in the biometric analysis.

In a yet further embodiment, the representation is obtained though filtering of the telephone line signals and rendering them into a stereo signal amplified for the end-user that reproduces a 2D or 3D mental representation of the conference call and positions of all participants.

The foregoing, together with other objects, features, and advantages of this invention can be better appreciated with reference to the following specification, claims and drawings.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE INVENTION

The following description is presented to enable one of ordinary skill in the art to make and use the invention.

Figure 1:
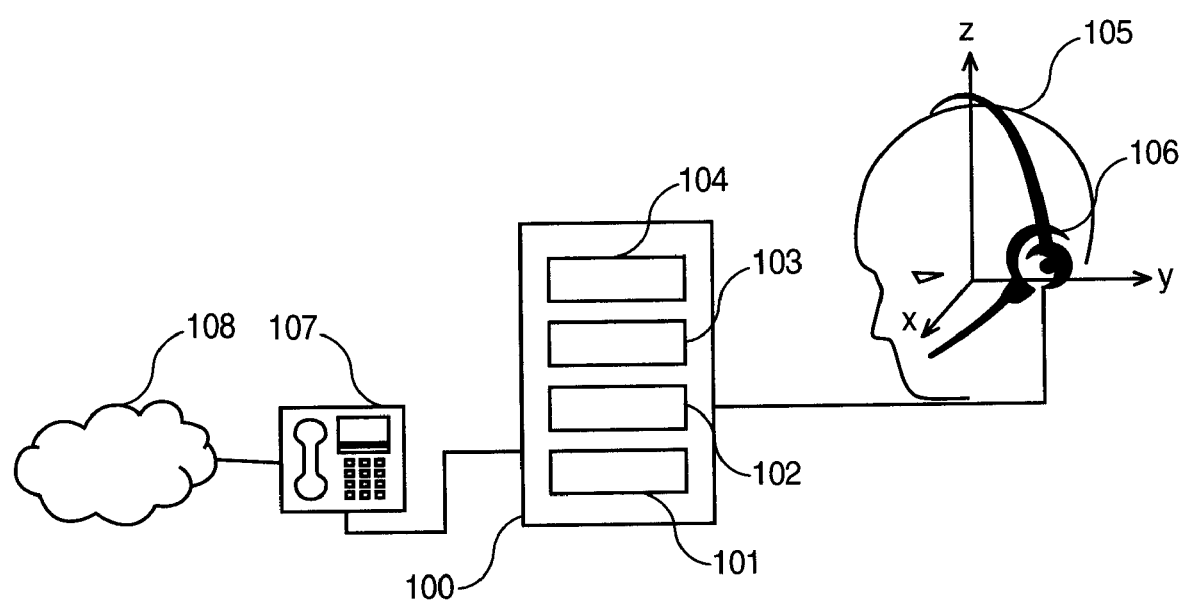
FIG. 1 is a general representation of the system according to the present invention.

According to FIG. 1, a spatialization system (100) according to the present invention sits between a regular telephone (107) and means as further described below for giving to a participant or end-user (105) a representation of the other participants in conference call. The telephone 107 is hooked up to a telephone network (108). The end-user 105 can be equipped with a headset (106). He can administer the spatialization system and activate one or all of four features:

- turning the spatialization feature on/off (101)
- selecting 2D or 3D sound rendering (102)
- setting the angles between two spatial representations of other participants, or setting the maximum number of other participants being able to be represented (103)
- making a choice of biometric parameters to be used by the spatialization system (104)

For sake of clarity, this administration of the system is further detailed after each one of the system's technical capabilities have been described below.

The system does not require other technical equipments, in particular, it does not require any central server hooked up to the telephone network 108 that the spatialization system 100 might otherwise use and query.

Figure 2:
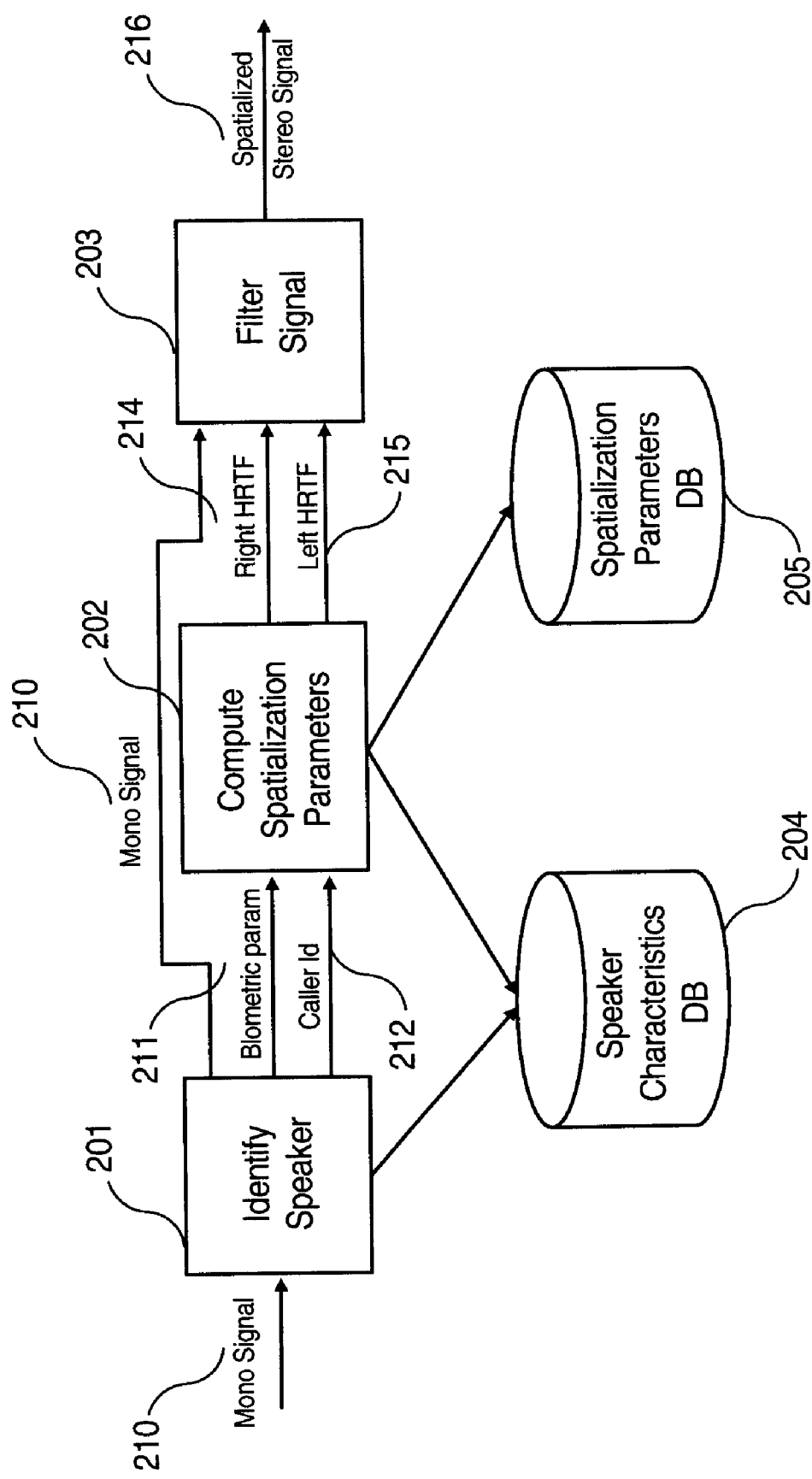
FIG. 2 is a detailed view of the main functions inside the system according to the invention.

Turning to FIG. 2, there is available a more detailed view of the main functions inside the spatialization system 100 according to the present invention. It comprises three main functions:

- Speaker Identification (201),
- Computation of Spatialization Parameters (202), and
- Signal Filtering (203);
- and two main databases;
- Speaker Characteristics Database (204), and
- Spatialization Parameters Database (205).

A mono signal (210) coming from the telephone 107 line, is transformed into an output stereo signal (216) for headset 106 of end-user 105, which provides for a spatial representation of the voice of any currently speaking participant in the conference call.

Speaker Identification means 201 identify the conference call participant currently speaking. A unique caller identification (212) is associated with each identified participant at the time when he/she joins the conference. The identification itself involves techniques further described with respect to FIG. 4.

Analysis of a participant's voice through the producing of a set of relevant biometric parameters (211) enables the system to compare this voice against other participants' voices. These voice parameters and caller identification are stored on Speaker Characteristics Database 204. This database is reset for each new conference call, whereas the Spatialization Parameters Database 205 is set once at system setup (power-on for example).

Once the currently speaking participant is identified, the system derives in Compute Spatialization Parameters 202, a position based on caller identification 212 and biometric parameters 211. The position details are then updated in the Speaker Characteristics Database 204. Right (214) and left (215) transfer functions that relate to a speaking participant's voice, that simulates the sounds that would be perceived by the left and right ears of the end-user, are then retrieved from the Spatialization Parameters Database 205.

The mono signal 210 that carries the currently speaking participant's voice is then filtered in Signal Filtering 203. Real time filtering of a signal can be implemented by a person skilled in the art using known algorithms, some of which are, for example, presented in the book "Discrete-Time Signal Processing" by Alan V. Oppenheim, Ronald W. Schafer, John R. Buck, Publisher: Prentice Hall, 2nd edition (Feb. 15, 1999), ISBN: 0137549202. The stereo signal 216 is then produced that mimics the position of the currently speaking participant.

Figure 3:
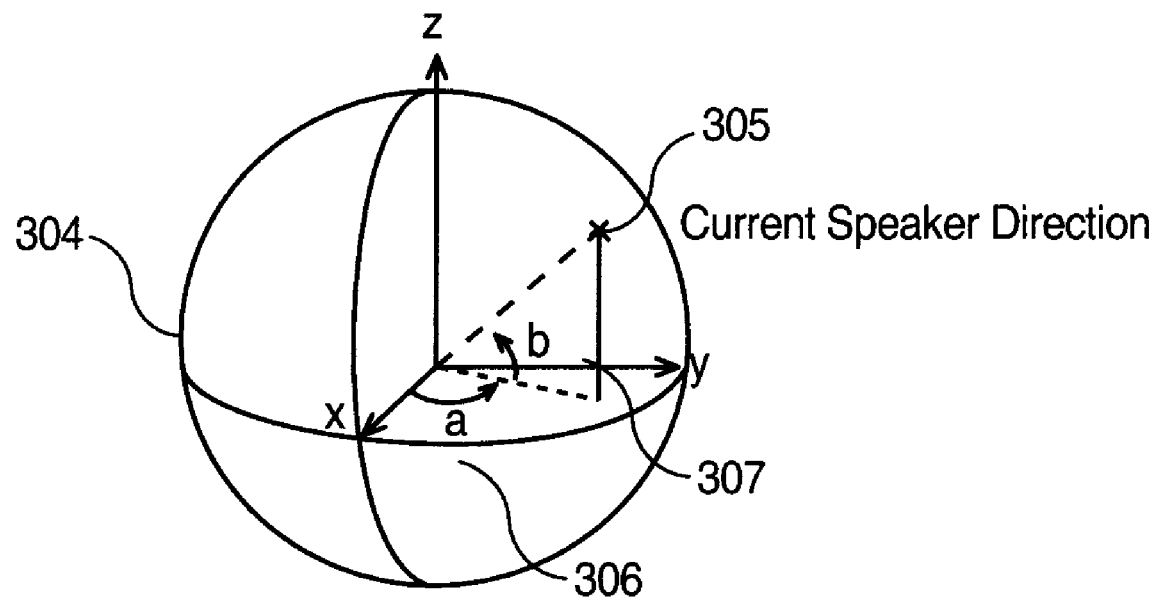
FIG. 3 depicts the spatial representation of the call and its participants.

FIG. 3 depicts the spatial representation of the conference call and its participants, that end-user 105 receives in the headset 106. The head of the end-user is represented as a sphere (304) in FIG. 3. The end-user perceives the voice of the currently speaking participant, as coming from a position (305) which may be defined by its azimuth a (306) and its elevation b (307) in a xyz reference.

In the case when 2D sound rendering is activated by end-user 105 through feature 102, elevation b is null, and the representation rendered of the call is in the plane xy.

Figure 4:
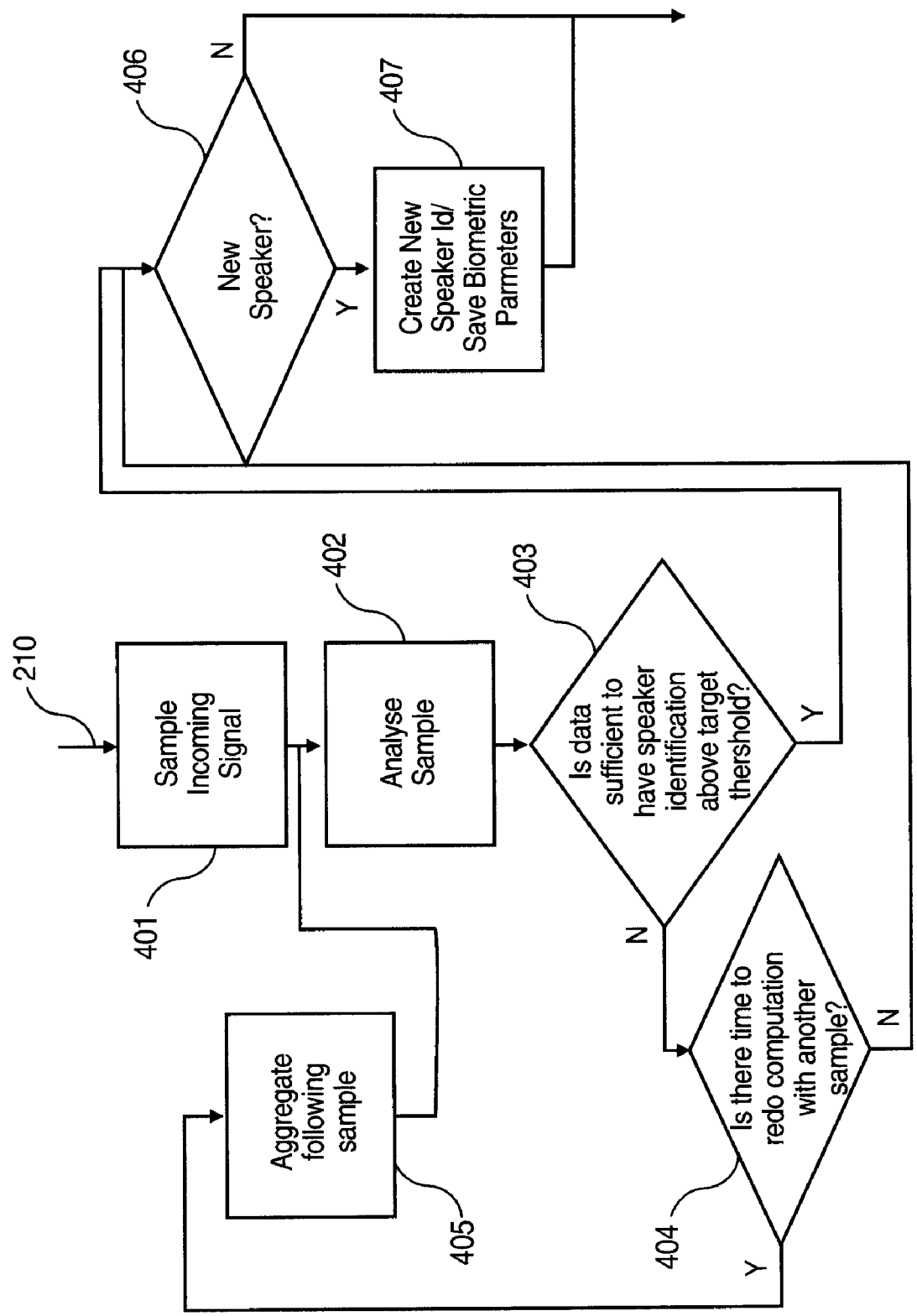
FIG. 4 is a detailed view of the tasks performed for speaker identification.

FIG. 4 is a detailed view of the tasks performed in Speaker identification 201. This is also with reference to known art in relation to biometric identification of a caller derived by the person skilled in the art from, for example, U.S. Pat. No. 6,865,264 or U.S. Pat. No. 6,262,979.

As skilled art persons will appreciate, the voice of the currently speaking participant comes on the public telephone network 108 in an analog form, and is conveyed to Speaker Identification 201 through signal 210.

Signal 210 is first sampled (401) to allow the performance of digital signal processing. A buffer is filled with the sampled data. The length of the buffer can be adjusted by a person skilled in the art, based on the expected performance of the system, the tolerance for delays, etc.

The buffered samples are then analyzed (402) and biometric parameters are computed based on the data. Different biometric parameters can be computed for voice identification. Persons skilled in the art often rely on cepstral coefficients to identify voices, based for example on the teaching of 2002 IEEE publication "Speaker identification using cepstral analysis" by Muhammad Noman Nazar. Other parameters can be used as well based, for example, on the teaching of 2001 Proceedings of the 23rd Annual EMBS International Conference, "Comparative analysis of speech parameters for the design of speaker verification systems" by A. F. Souza and M. N. Souza:

- Autocorrelation Coefficients
- Area Coefficients
- Area Ratios
- Formants Frequencies
- Log Area Ratios
- Line Spectrum Pairs Autocorrelation Coefficients of the Inverse Filters Impulsive Response
Reflection Coefficients
Z-Plane Autoregressive Poles The confidence level of the value of these biometric parameters is then estimated (403). If the confidence level is above a predetermined threshold then the system goes to the next step (406).

If the confidence level is below that threshold, then additional data is required to compute the biometric parameters with an adequate level of confidence. The system then evaluates (404) if the additional computational delay introduced by the aggregation of data is going to be higher than a predetermined maximum authorized delay.

If not, the system aggregates (405) the data and performs again the biometric parameters analysis (402 and 403).

If additional computation exceeds the predetermined maximum authorized delay, then the system goes to the next step 406. In this situation, there will be a high risk of error (a discussion on FMR or FNMR is offered below in connection with FIG. 7). In that context, the setting of the maximum authorized delay is important and those skilled in the art will appreciate that it can be predetermined to match any particular required error probability.

Given computed cepstral coefficients, the system then checks (406) in a table for a matching set of parameters. This checking is more fully described in relation to FIG. 5.

If none is found then the currently speaking participant is new to the conference, and is added (407) to the systems representation of the conference, by linking speaker and its biometric parameters to speaker identification.

If the currently speaking participant has previously been identified by the system, no action is taken.

In both cases, participant identification and associated biometric parameters are passed on to the next sequential tasks.

Figure 5:
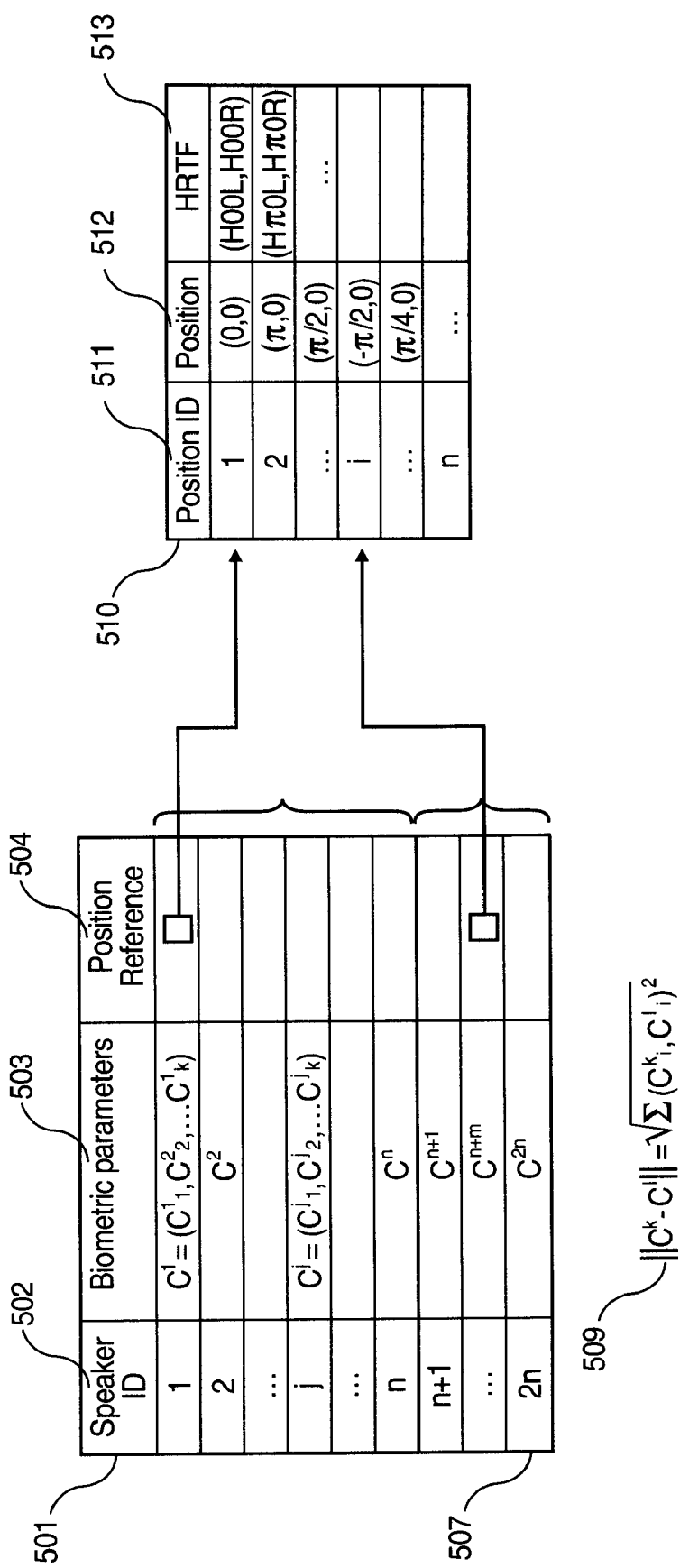
FIG. 5 is a complete view of the tables used for the management of participant's in a telephone conference.

FIG. 5 shows complete descriptions of the tables used for the management of currently speaking participant's identification and associated biometric parameters. Tables are used by the system to store information in a permanent way (for the duration of the conference call) that will enable it to spatially distribute the voices of the various participants to the conference.

The system keeps track of the different participants in table (501). This table is reset for each new conference call. It is typically stored in the Speaker Characteristics Database 204.

Speaker Identification is stored in column (502). Typically, the first speaking participant is given identification number 1, with each new joining participant having an identification incremented by one.

Biometric Parameters associated with each participant are stored in column (503).

Position References, more fully described in connection with FIG. 6 and associated with each participant and their Biometric Parameters, are stored in column (504).

For each speaking participant, a determination is made, as shown with step 406 on FIG. 4, as to whether this is a new participant, not yet identified by the system. For any new participant, a new entry is added to table 501. The first n participants get a Position Reference in column 504 amongst a predefined set of positions which is distributed evenly across the plane (2D) or the space (3D).

In one embodiment of the invention, for each new participant after the nth one, the Position Reference is not predefined anymore, but is dynamically computed. The system sets Position Reference 504 to point towards a Position Identification i (511) in a table (510) so that:

position i is not already occupied, and
$\|C_{n+m}-C_i\|=\max \|C_{n+m}-C_j\| \mid j=1\ldots n$ A metric is associated with each set of biometric parameters as a measure of the difference between voices' characteristics. The distance between two cepstal vectors can be defined as the euclidian distance (509).

Any added participant after n current participants is given the same position as the position of the current participant which gives the highest value for the euclidian distance 509.

The system is set to accommodate 2n participants.

Table 510 associates with each Position identification 511 a position (512) made of two angles, the azimuth 306 and the elevation 307, and two Head Related Transfer Function (HRTF) filters (513), one for the left ear and one for the right ear of the headphone 106, computed for this position.

In case of 2D functioning, elevation 307 is set to 0.

Each HRTF 513 being specific to a given position, they are to be computed in advance. Persons skilled in the art of 3D sound can use different mechanisms to compute them. Sets of HRTFs are publicly available. An example may be found at http://sound.media.mit.edu/KEMAR.html ("KEMAR HRTF data, originally created May 24, 1995, lastly revised Jan. 27, 1997, Bill Gardner and Keith Martin, Perceptual Computing Group, MIT Media Lab, rm. E15-401, 20 Ames Street, Cambridge Mass. 02139).

If additional HRTF are needed, the system computes them, in particular through interpolation of the existing ones.

Figure 6:
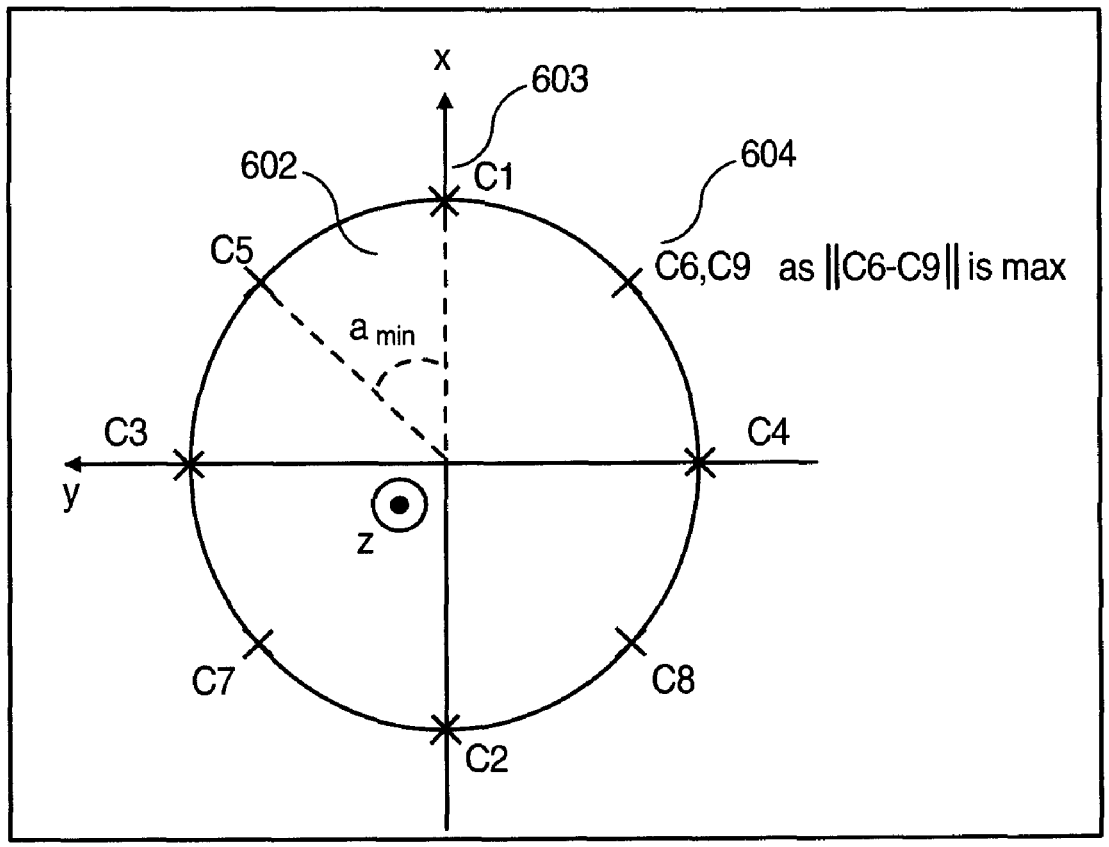
FIG. 6 depicts an example of a planar representation of a conference call.

FIG. 6 gives an example of planar representation of the conference call. The system sets the positions in the plane for n equals 8 (i.e. 16 participants maximum) with a minimum angle (602) between speakers of pi/4.

All participants up to 8 are assigned to a predefined position on the circle, with the first one being "in front" (603) of end-user 105, the second one behind him, etc. until 8.

The $9^{th}$ caller is placed in the same position as participant number 6 (604) since they have the greatest difference between voices' characteristics.

Figure 7:
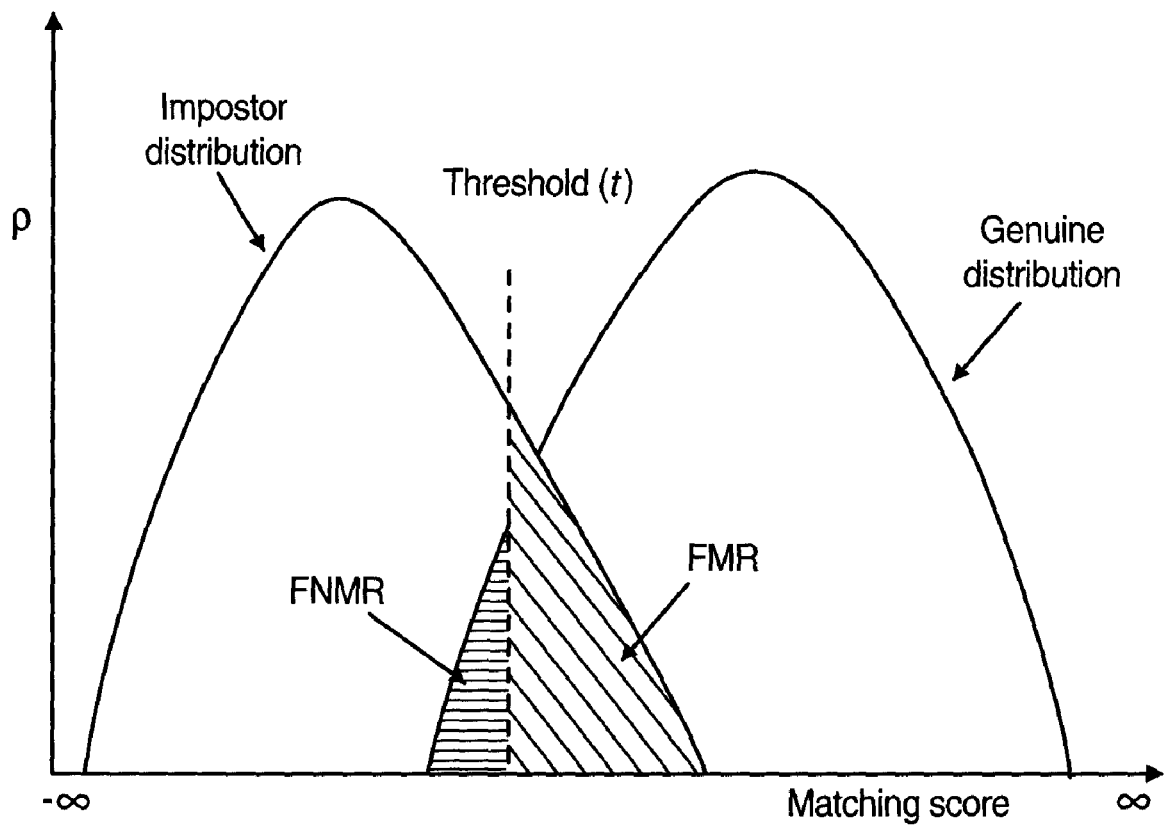
FIG. 7 depicts the types of errors made by biometric verification systems.

Turning now to FIG. 7, also in connection with art known to the skilled person, such as: "An introduction to biometric recognition", by A. Jain, A. Ross and S. Prabhakar, IEEE Transactions on Circuits and Systems for Video Technology, VOL. 14, No. 1. January 2004, a biometric verification system can make two types of errors:

1) mistaking biometric measurements from two different persons to be from the same person (called false match), and 2) mistaking two biometric measurements from the same person to be from two different persons (called false non-match).

These two types of errors are also often termed as false accept and false reject, respectively. There is a tradeoff between false match rate (FMR) and false non-match rate (FNMR) in every biometric system. In fact, both FMR and FNMR are functions of the system threshold; if it is decreased to make the system more tolerant to input variations and noise, then FMR increases. On the other hand, if it is raised to make the system more secure, then FNMR increases accordingly. This is easily seen from FIG. 7 by visually shifting the threshold t left and right in the Fig and observing how the regions FMR and FNMR are affected.

Administration of system 100 by end-user 105 can now be described in connection with FIG. 1.

The system 100 can act as a regular phone when the spatialization feature is off and as the conference call spatialization apparatus when this feature is on with on/off 101.

The end-user 105 can decide with selection 102 to get a 2D representation of the call, meaning with voices coming from different directions but in the same horizontal plane, or in 3D, i.e., with the perceived direction of voice reception having a non-null elevation (angle 307 not null).

Based on the distance that the end-user 105 wants between the different participants' voices, he or she can then set using means 103 a minimal azimuth angle that is then used to compute the different possible speaker positions in the plan. A minimum elevation angle can also be set in case of 3D spatialization. One of the consequences of this setting is to set the maximum number of participants that the system can handle. There is thus a trade off between a better participant discrimination and a greater number of represented participants.

The end-user can also set with means 104 different biometric parameters for the analysis of the speaking participants' voice. The achieved result is an improved identification of the participants.

While the invention has been particularly shown and described with reference to a preferred embodiment, it will be understood that various changes in form and detail may be made therein without departing from the spirit, and scope of the invention.

We claim:

1. A system for facilitating to an end-user, the recognition of participants attending a conference call comprising:
   means attached to said end-user's telephone for receiving signals from a telephone line;
   means for analyzing said telephone line signals comprising means for making a biometric analysis of each participant's voice to distinguish one participant from another and means for associating a unique caller identification to each participant joining the conference call;
   means for associating with each said caller identification, a unique spatial position in a stereophonic representation of the conference call; and
   means for converting said telephone line signals into said stereophonic representation of said conference call in which, to said end-user, voices of different participants in said conference call are made to sound as coming from different directions corresponding to said unique positions associated with the caller identifications for participants in the conference call.

2. The system of claim 1, wherein said means for making a biometric analysis of said participants' voices further comprising means for determining whether a participant currently speaking is new to the conference call or has already been associated with a unique caller identification.

3. The system of claim 1, wherein said stereophonic representation of the conference call has a predetermined number of different positions from which participants' voices are heard.

4. The system of claim 3, wherein said end-user determines said number of positions.

5. The system of claim 3, wherein said means for associating include means for, when there is more of said participants than said predetermined number of positions, allocating in said stereophonic representation to a new participant a same position as a first participant where the first participant is determined to have the most different voice characteristics from said new participant as compared to all other participants after said biometric analysis.

6. The system of claim 1, characterized in that said means for converting comprise means for applying filters to said telephone line signals so as to produce and amplify said stereophonic representation for said end-user.

7. The system of claim 1, wherein said different positions are arranged within a plane and surround said end-user.

8. The system of claim 1, wherein said different positions are arranged on a sphere around said end-user, said different positions having different elevations on said sphere relative to said end-user.

9. A method for facilitating to an end-user, the recognition of participants attending a conference call comprising:
   receiving signals for said conference call from a telephone line;
   analyzing said signals biometrically and, based on said biometric analysis, associating a unique caller identification to each participant joining the conference call;
   associating with each said caller identification, a unique spatial position in a representation of the conference call; and
   producing a stereo audio signal from said telephone line signals of said conference call in which, to said end-user, voices of different participants are heard coming from different directions corresponding to said unique spatial positions associated with said different participants in the conference call.

10. The method of claim 9, wherein said analyzing comprising performing a biometric analysis of a participant's voice to determine whether a participant is new to the conference call or has already been associated with a unique caller identification.

11. The method of claim 9, wherein associating each caller identification with a unique spatial position comprises assigning each participant in said conference call one of a predetermined number of positions.

12. The method of claim 11, wherein said end-user determines said number of positions.

13. The method of claim 11, further comprising, when all of said positions have been assigned, comparing voice characteristics of an additional participant in said conference call with voice characteristics of previous participants assigned to said number of positions and assigning said additional participant to a same position as that previous participant having the most different voice characteristics as compared to said additional participant.

14. The method of claim 9, in which said spatial positions are evenly spaced apart from each other with respect to a position occupied by said end-user.

15. The method of claim 9, in which said spatial positions are arranged in a plane around said end-user.

16. The method of claim 9, in which said spatial positions are arrange on a sphere around said end-user.

17. A storage medium containing computer program instructions, which, when executed by a computer, cause the computer to perform a method for facilitating, to an end-user, the recognition of participants attending a conference call, the storage medium containing:
   program instructions for receiving signals from a telephone line;
   program instructions for analyzing said telephone line signals and associating a unique caller identification to each participant joining the conference call;
   program instructions for associating with each said caller identification, a unique spatial position in a stereophonic representation of the conference call; and
   program instructions for converting said telephone line signals into said stereophonic representation of said conference call in which, to said end-user, voices of different participants in said conference call are made to sound as coming from different directions corresponding to said unique positions associated with the caller identifications for participants in the conference call such that said end-user can more readily distinguish between different participants who are speaking during the conference call; and program instructions with which said end user selects whether said unique positions are arranged (1) around said end-user in three-dimensions on a sphere, each unique position being defined by an azimuth and elevation relative to said sphere, or (2) around said end-user in two-dimensions on a circle.

18. The storage medium of claim 17, wherein the program instructions for associating further perform a biometric analysis of said participants' voices.

19. The storage medium of claim 17, wherein the program instructions for associating can allocate a predetermined number of positions in the representation.

20. The storage medium of claim 19, wherein the program instructions for associating allows the end-user to determine said number of positions.

21. The storage medium of claim 19, in which the instructions for associating includes, when there is more of said participants than said predetermined number of positions, instructions for allocating in said representation to a new participant a same position as another participant having the most different voice characteristic after said biometric analysis.

22. The storage medium of claim 17, in which the instructions for representing includes instructions for applying filters to said signals so as to render said representation into a stereo audio signal amplified for said end-user.

23. The storage medium of claim 22, in which said different positions are arranged within a plane and surround said end-user.

24. The storage medium of claim 22, in which said different positions are arranged on a sphere around said end-user.

25. A system for facilitating to an end-user the recognition of participants attending a conference call comprising:
- a connection for receiving an audio signal of a telephonic conference call;
- a system for biometrically identifying individual participants in said conference call by analyzing speech parameters for each participant;
- a system for converting said audio signal of said telephonic conference call into a stereo audio signal in which voices of different individual participant are made to sound as if coming from different directions.

* * * * *